April 24, 1962

J. A. DRAKE 3,030,772

MASS FUEL-AIR RATIO METERING CONTROL
FOR GASEOUS FUEL SYSTEM
Filed July 1, 1960

INVENTOR.
JOHN A. DRAKE

BY R. E. Geougue

ATTORNEY

United States Patent Office 3,030,772
Patented Apr. 24, 1962

3,030,772
MASS FUEL-AIR RATIO METERING CONTROL
FOR GASEOUS FUEL SYSTEM
John A. Drake, Sherman Oaks, Calif., assignor to The
Marquardt Corporation, Van Nuys, Calif., a corporation of California
Filed July 1, 1960, Ser. No. 40,358
7 Claims. (Cl. 60—39.28)

This invention relates to a device for metering gaseous fuels and more particularly, to a device for metering gaseous fuels to maintain a selected fuel-air ratio in an air-breathing engine.

Metering devices have been utilized for metering liquid fuel to an air-breathing engine in order to maintain a selected fuel-air ratio. One such device is disclosed in U.S. patent application entitled Air Mass Flow Computer, Serial No. 708,675, filed January 13, 1958 by B. T. Arnberg et al. and assigned to the same assignee. This device utilizes a probe in the form of a cold-flow ram jet engine model which is utilized to obtain a measure of actual air flow through the engine. In the prior device it is necessary to obtain a separate signal of air mass flow for use in fuel flow regulators.

In the present invention, a probe in the form of a cold flow ram jet model is utilized to swallow an airflow which is proportional to the airflow entering the main engine. The probe inlet is exposed to the same air conditions as the main engine inlet or to conditions which will satisfy the requirement of swallowing a definite proportion of the engine air mass flow. The captured air is discharged from the probe through a probe exit nozzle and a pressure at the probe nozzle is utilized as a measure of the air flow through the engine. Prior to discharge from the probe nozzle, the air captured by the probe travels through a heat exchanger which is designed to bring the air temperature to a value almost identical to the temperature of the fuel supplied to the engine.

The gaseous fuel for the engine enters a fuel supply passage through a control valve and the passage contains the heat exchanger for the probe air and a fuel nozzle connecting with the engine manifold. The fuel supply pressure at the fuel control valve will be maintained at a high enough value to insure that the nozzle in the fuel line downstream of the heat exchanger will be choked over the operating range of fuel flow. In other words, a sonic flow of the fuel at the nozzle throat will be maintained over the operating range. A second pressure at the nozzle in the fuel line is obtained as a measure of the fuel mass flow to the engine manifold. Thus, the two measured pressures provide a pressure signal of air mass flow and of fuel mass flow and by introducing these two pressures into a differential regulator, a given fuel-air ratio for the ram engine can be continually maintained.

It is therefore an object of the present invention to provide a metering device for gaseous fuels in which a cold flow ram jet engine model is utilized to capture air which is passed in heat exchanger relationship with the fuel before discharge through the probe exit nozzle, the pressure at the nozzle being a signal of air mass flow through the main engine.

Another object of the invention is to provide a metering device for gaseous fuels which utilizes a miniature ram jet probe having an exit nozzle, and a fuel flow line containing a nozzle; the probe air and fuel being in heat exchange relationship ahead of said nozzles and the pressures ahead of the nozzles providing direct measures of air flow and fuel flow, respectively.

A further object of the invention is to provide a metering device for gaseous fuels which gives direct control of the fuel-air ratio without the necessity of a separate measurement of fuel flow, either directly or by means of a separate regulator.

Another object of the invention is to produce a pressure ratio which provides a direct measure of fuel-air ratio.

These and other objects of the invention not specifically set forth above will become readily apparent from the accompanying description and drawings, in which.

Figure 1:
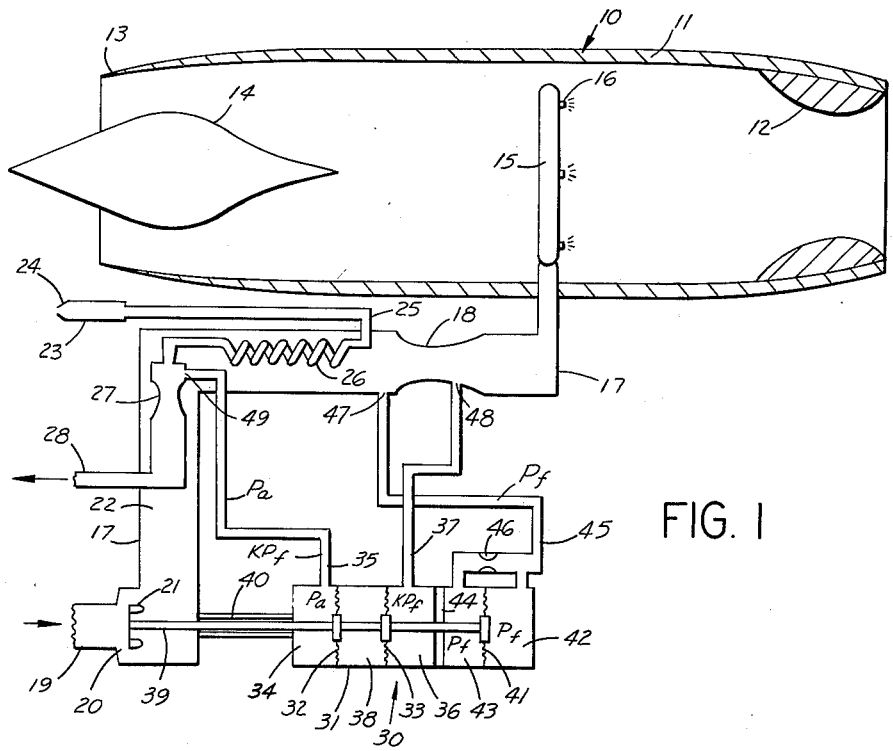
FIGURE 1 is a diagrammatic illustration of the metering device of the present invention, showing the gaseous fuel passage connected to the manifold of a ram jet engine.

Referring to the embodiment of the invention illustrated in FIGURE 1, a ram jet engine 10 comprises a casing 11 having an exit nozzle 12 and an inlet 13 containing a diffuser body 14. A fuel manifold 15 is located between the inlet and exit nozzle and is connected with a plurality of fuel jets 16 for distribution of the gaseous fuel within the engine. The manifold 15 is supplied with fuel from fuel passage 17 which contains fuel nozzle 18. Fuel is introduced to passage 17 from supply passage 19 through a valve opening 20 controlled by a valve 21. The fuel passes through the valve opening 20 into space 22 within passage 17 and then through the nozzle 18 into the manifold 15. The fuel supply pressure in the passage 19 is great enough at all times to insure that the nozzle 18 will be choked over the full operating range of fuel flow, i.e., the nozzle will have sonic flow of the gaseous fuel at its throat under all operating conditions.

A probe 23 in the form of a cold flow ram jet model is located in the supersonic air stream and has a normal shock type inlet 24 which is designed to swallow an air flow proportional to the air flow entering the main engine 10. The inlet 24 of the probe 23 is connected by passage 25 to heat exchanger coil 26 located in space 22 within passage 17. The discharge end of coil 26 is connected to a probe nozzle 27 which exhausts through passage 28. Since the probe 23 senses only a small fraction of the air flow, the total fuel flow through passage 17 will far exceed the air flow through the probe. Heat exchanger 26 will be exposed to nearly constant fuel temperature since the fuel flow will far exceed the small air flow in the probe. Therefore, the air temperature in passing through the coil 26 will be brought to a value almost identical to the fuel temperature in space 22.

The valve 21 is controlled by a regulator 30 which comprises a casing 31 containing a pair of spaced diaphragms 32 and 33. Space 34 on one side of diaphragm 32 receives the pressure in passage 35 and space 36 at one side of diaphragm 33 receives the pressure in passage 37. The chamber 38 intermediate the diaphragms 32 and 33 is filled with an inert gas, such as helium at one atmosphere, so that the gases in spaces 34 and 36 cannot contact one another and explode. Both diaphragms are connected to the stem 39 for the valve 21 and the stem is supported by a bearing 40 located between the casing 31 and the passage 17. A third diaphragm 41 is located in casing 31 and defines a space 42 at one side and a space 43 at the other side which is separated from space 36 by a partition 44. The stem 39 passes through partition 44 and is connected to the diaphragm 41. Space 42 connects directly with a passage 45 while the space 43 connects to passage 45 through a restriction 46. The passage 45 connects opening 47 in nozzle 18 to receive the static pressure $P_f$ upstream of the nozzle 18. Upon a change in fuel flow in passage 17, the space 42 will sense the pressure $P_f$ directly while the chamber 43 will sense a lagged pressure $P_f$ because of the restriction 46 and these pressures are used to provide a proportionalplus-integral control in order to stably maintain the selected value of fuel air ratio.

The passage 35 connects with the static pressure opening 48 in the divergent portion of the fuel nozzle 18 so that it senses a fractional pressure of $P_f$, namely $kP_f$, which is a signal proportional to mass fuel flow through the passage 17. The passage 35 connects with the static pressure opening 49 upstream of the nozzle 27 to provide a measure of the mass air flow through the probe 23, which flow is proportional to the mass air flow through the main engine 10. Thus, the pressures $kP_f$ and $P_a$ are the direct signals of mass air flow and fuel flow, respectively, and these pressures act on diaphragms 33 and 32 to maintain a fuel flow which is a given proportion of the mass air flow so that a design fuel air ratio can be maintained. In the steady state condition of the regulator 30, the pressure $kP_f$ in chamber 36 equals the pressure $P_a$ in chamber 34 and the pressure $P_f$ in chamber 42 equals the lagged pressure $P_f$ in chamber 43. It is understood that the helium in chamber 38 has no net effect on the pressure balance of the regulator 30. Thus, the regulator maintains the ratio of $P_f/P_a$ equal to the constant $k$, the selected value of which determines the fuel-air ratio of the main engine.

It can be shown that the ratio $P_f/P_a$ is proportional to the fuel-air ratio $W_f/W_a$. The equation for mass flow through the nozzle 18 is as follows:

$$W_f = \frac{P_{t_f} A_f f(Mo)}{\sqrt{T_{t_f}}}$$

where $W_f$ is the mass fuel flow through the nozzle 18, $P_{t_f}$ is the total fuel pressure at the fuel nozzle entrance, $A_f$ is the effective area of the fuel nozzle throat, $f(Mo)$ is a function of Mach number which is a constant since the nozzle 18 is choked, and $T_{t_f}$ is the total temperature at the fuel nozzle entrance. In a similar manner, the air mass flow through the choked orifice 27 can be represented as $$W_a = \frac{P_{t_a} A_a f(Mo)}{\sqrt{T_{t_a}}}$$

where $W_a$ is the air mass flow through the probe, $A_a$ is the effective area of the probe exit nozzle throat, $f(Mo)$ is a function of Mach number which is constant, $P_{t_a}$ is the total air pressure at the probe nozzle, and $\sqrt{T_{t_a}}$ is the total temperature at the probe nozzle. By dividing the above two equations to obtain the ratio of $W_f/W_a$, the Mach number functions and the square roots of total temperatures cancel out since the total temperature of the air entering nozzle 27 is made equal to the total temperature of the fuel entering nozzle 18 by utilization of the heat exchanger 26. Therefore, $$W_f/W_a = K_1 \frac{P_{t_f}}{P_{t_a}}$$

where $K_1$ is a ratio of the throat areas of the two nozzles $$\frac{A_f}{A_a}$$

While $P_f$ and $P_a$ are static pressure at the nozzles 18 and 27, respectively, these pressures are proportional to the total pressures $P_{t_f}$ and $P_{t_a}$ since the flow velocity through the nozzles is low and fairly constant. Thus $$W_f/W_a = K_2 \frac{P_f}{P_a}$$

where $K_2$ includes the proportionality factor between the static and total pressures.

In operation of the invention, an increase in the air flow through the engine would increase the pressure $P_a$ and the valve regulator 30 will start to open the valve 21. This movement of the valve causes an increase in pressure $P_f$ and the motion of the valve is controlled by the feedback pressures $P_f$ and lagged $P_f$. Also, the increase in pressure $P_f$ causes an increase in pressure $kP_f$ and as $kP_f$ approaches $P_a$, the lagged pressure $P_f$ approaches $P_f$. Equilibrium of the diaphragms of the regulator 30 is reached when the design value of $P_f/P_a$ and $W_f/W_a$ is again obtained in the main engine. In the same manner, if the air flow decreases, the pressure $P_a$ will decrease and the valve 21 will move to close the passage 17. This motion results in a decrease in pressure $P_f$ and in pressure $kP_f$. Equilibrium is again reached at the design value of $P_f/P_a$ as originally existed.

Figure 2:
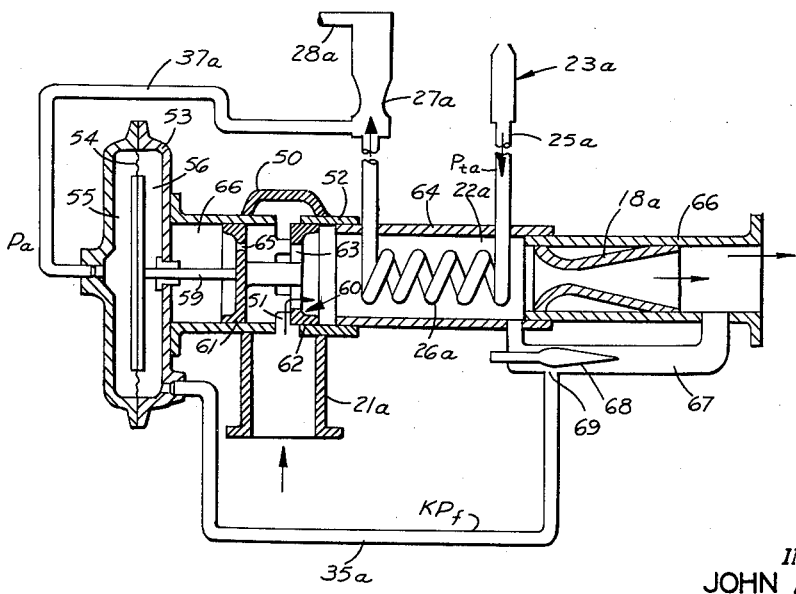
FIGURE 2 is a sectional view of a regulator device utilizing the present invention.

Referring to FIGURE 2, a physical embodiment of the metering device is illustrated and comprises a fuel inlet passage 21a which communicates with a manifold 50 surrounding a plurality of inlet openings 51 in casing section 52. A chamber 53 is secured to section 52 and contains a diaphragm 54 which has spaces 55 and 56 on opposite sides thereof. The pressure $P_a$ is connected with space 55 through passage 37a and the pressure $kP_f$ is connected with space 56 through passage 35a. The diaphragm is connected with a stem 59 which in turn connects with the fuel valve 60 comprising spaced piston heads 61 and 62. The head 62 contains central opening 63 and the position of the head 62 regulates the fuel flow through openings 51 and 63 to the fuel passage 22a in casing section 64. The piston head 61 contains a restricting orifice 65 connecting with a chamber 66. Thus, the piston head 61 receives the pressure $J_f$ in passage 22a on one side and the lagged pressure $P_f$ in the chamber 66 on the other side so that the piston head 61 provides the proportional-plus-integral control provided by the diaphragm 41 of the prior embodiment. The probe 23a is connected by passage 25a to the heat exchanger coil 26a located in passage 22a within the casing 64 and the coil discharges through the nozzle 27a to which is connected the passage 37a. Fuel nozzle 18a is located in a casing section to the engine manifold (not shown). Passage 67 parallels the fuel nozzle 18a and contains a needle 68 which provides an annular orifice in the passage 67. A static opening 69 in passage 67 measures a pressure $kP_f$ in the annular orifice. By moving the needle 68 relative to the opening 69, a variable pressure $kP_f$ is obtained so that the value $K_2$ which determines the fuel air ratio can be selected. It is understood, of course, that the pressure $kP_f$ can be obtained by a static rod or wall taps in the nozzle 18a proper. Since the diaphragm 54 receives the pressure $kP_f$ and $P_a$, the valve 60 will maintain the selected fuel air ratio.

It is understood that a change in the value of the constant $K_2$ will provide a new value of fuel-air ratio which is demanded and the valve 21 will move until any selected value is obtained. One manner in which the value of $K_2$ can be changed is to move the pickup opening 48 along the divergent portion of the nozzle 18 to sense varying fractions $k$ of the pressure $P_f$. It is understood that while the regulator 30 drives the fuel valve directly, it could be used separately with a slave piston driving the fuel valve. The inlet of the probe 23, utilized with an engine operating over a wide range of Mach numbers, can be made variable with the inlet geometry of the main engine. In such a case, the motion of the engine inlet actuators may be fed directly into the probe so that the probe geometry variations satisfy the requirement of proportional air flow. The amount of air captured by the engine and by the probe is a function of Mach number, and the proportionality between the probe air flow and engine air flow varies considerably at engine speeds in the hypersonic range. Thus, the illustrated form of the invention is more useful at low supersonic speeds. Since the ratio $P_f/P_a$ is a direct measure of fuel air ratio, the regulator can directly drive the valve and give direct control of fuel air ratio without the necessity of a separate measurement of fuel flow, either directly or by means of a regulator. While static pressures have been utilized in the regulator it is understood that total pressures associated with the nozzles could also be utilized. Various other modifications are contemplated by those skilled in the art without departing from the spirit and scope of the invention as hereinafter defined in the appended claims.

What is claimed is:

1. A device for metering gaseous fuel to a main air breathing engine comprising a probe having an inlet receiving an air flow proportional to the air flow entering the main engine, a choked probe exit nozzle connected with said probe inlet, a fuel passage connected with the main engine and containing a choked fuel nozzle, means for placing the probe air and gaseous fuel in heat exchange relationship so that the probe air upstream of the probe nozzle reaches the same temperature as the gaseous fuel upstream of the fuel nozzle, a fuel valve in said fuel passage, and regulator means connected with said fuel valve and operated by pressures at said probe nozzle and fuel nozzle representing mass air flow and mass fuel flow, respectively, for maintaining a selected fuel-air ratio in the main engine.

2. A device for metering gaseous fuel to a main air-breathing engine comprising a probe having an inlet receiving a sample air flow proportional to the air flow entering the main engine, heat exchanger means connected with said probe inlet, a choked probe exit nozzle connected with the discharge end of said heat exchanger means, fuel passage means connected with said main engine and containing a fuel valve, a choked fuel nozzle in said fuel passage downstream of said fuel valve, said heat exchanger means being located in said fuel passage intermediate said fuel valve and fuel nozzle for making the probe air temperature the same as the fuel temperature, means connected with said fuel nozzle for obtaining a pressure proportional to mass fuel flow, means connected with said probe nozzle for obtaining a pressure proportional to mass air flow in the main engine, and regulator means responsive to the ratio of said pressures for controlling said fuel valve and thereby controlling the fuel air ratio in the main engine.

3. A device for metering gaseous fuels to a main air-breathing engine comprising a cold-flow ramjet probe having an inlet for swallowing an airflow proportional to the airflow in the main engine, a choked probe exit nozzle connected with said probe inlet, heat exchanger means connected intermediate said probe inlet and said probe nozzle for controlling the temperature of the air entering said probe nozzle, means connected with said exit nozzle for obtaining a first pressure proportional to mass air flow through said probe and through said main engine, a gaseous fuel passage connected with said main engine and containing a choked fuel nozzle, a control valve in said fuel passage upstream of said fuel nozzle, means connected with said fuel nozzle for obtaining a second pressure proportional to mass fuel flow through said passage to said main engine, said heat exchanger means being located in said fuel passage intermediate said control valve and said fuel nozzle so that the temperature of the air in said probe upstream of said probe nozzle becomes equal to the temperature of the fuel in said fuel passage upstream of said fuel nozzle, and regulator means responsive to said first and second pressures and connected with said control valve to maintain a selected ratio between said pressures and thereby maintains a selected fuel air ratio in said main engine.

4. A metering device as defined in claim 3 wherein said regulator means comprises diaphragm means located in a casing and connected with said control valve, means for introducing said first pressure to one side of said diaphragm means, and means for introducing said second pressure to the opposite side of said diaphragm means.

5. A metering device as defined in claim 4 wherein said casing contains a second diaphragm means connected with said control valve, means for obtaining a third pressure proportional to fuel flow in said passage, means for introducing said third pressure directly to one side of said second diaphragm means, and passage means containing a restriction for introducing said third pressure to the opposite side of said second diaphragm means through said restriction to obtain proportional-plus-integral control.

6. A metering device as defined in claim 3 wherein said first pressure obtaining means comprises a static pressure line connected with said probe at the entrance to said probe nozzle.

7. A metering device as defined in claim 3 wherein said second pressure obtaining means comprises a static pressure line connected with the divergent portion of said fuel nozzle at a location to obtain a second pressure which is a selected fraction of the static pressure at the entrance to said fuel nozzle.

No references cited.